Figure 1:
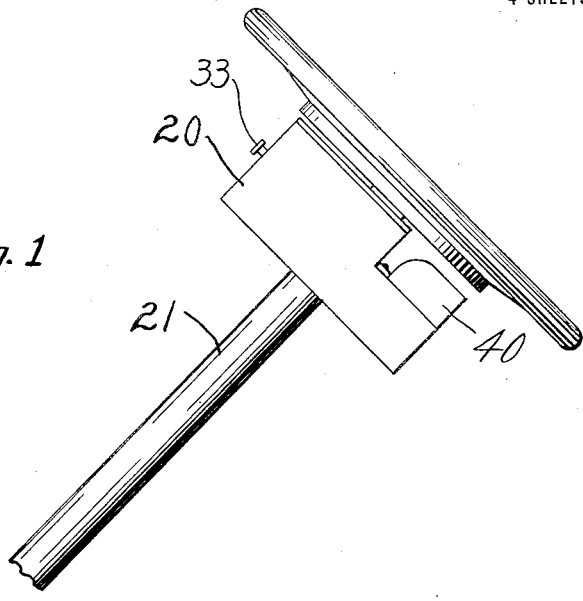

F. K. FASSETT.
THEFT PREVENTION DEVICE FOR AUTOMOBILES.
APPLICATION FILED FEB. 6, 1914.

1,139,757.

Patented May 18, 1915.
4 SHEETS—SHEET 1.

Witnesses
C. H. Kruger
J. H. Fassett

Inventor
Francis K. Fassett

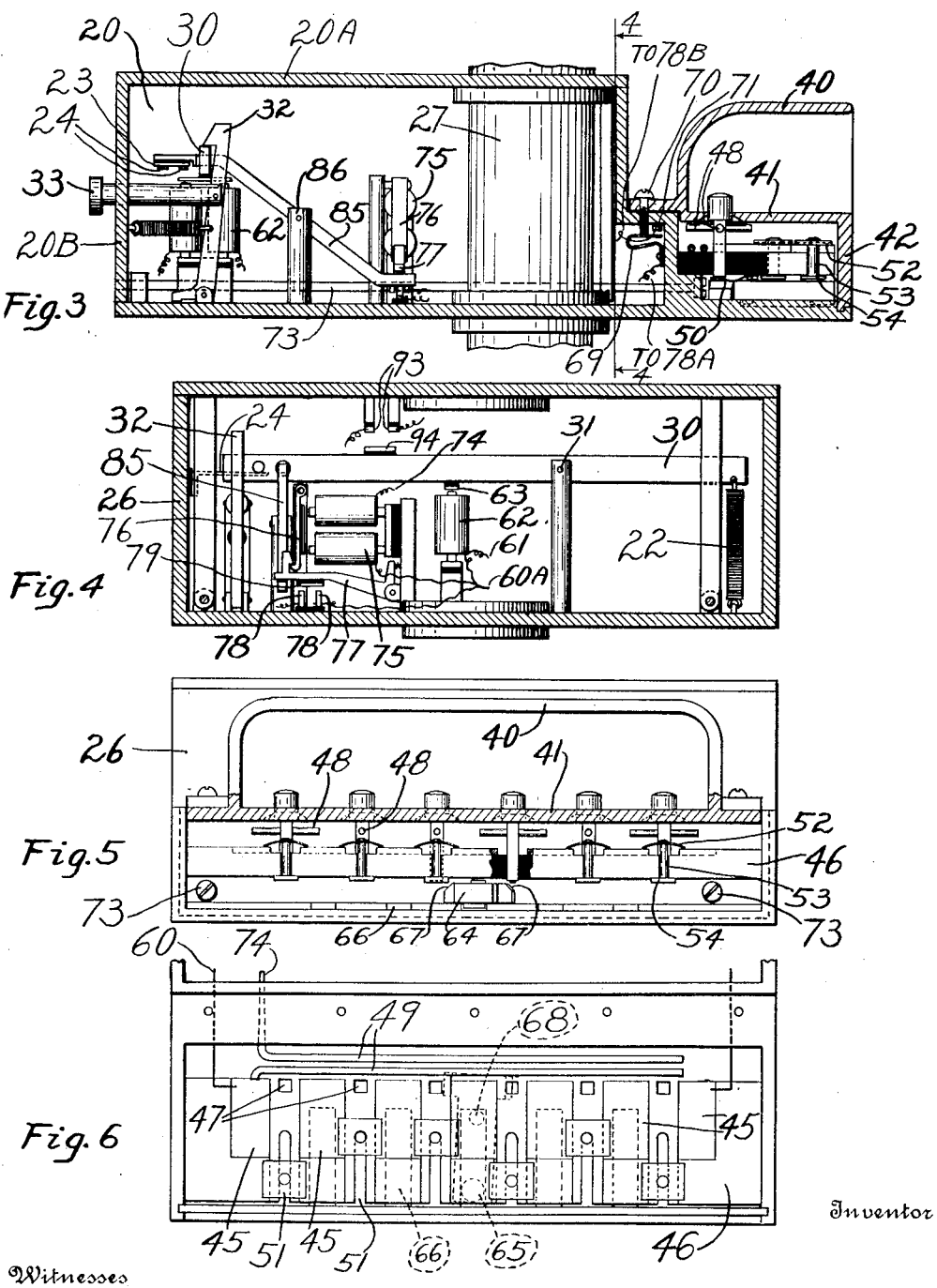

F. K. FASSETT.
THEFT PREVENTION DEVICE FOR AUTOMOBILES.
APPLICATION FILED FEB. 6, 1914.
1,139,757.
Patented May 18, 1915.
4 SHEETS—SHEET 3.
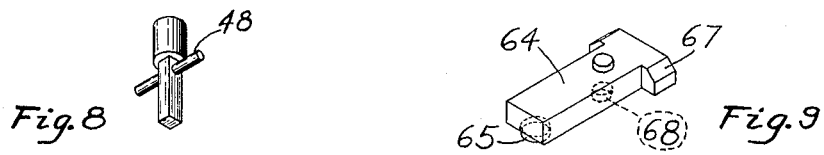
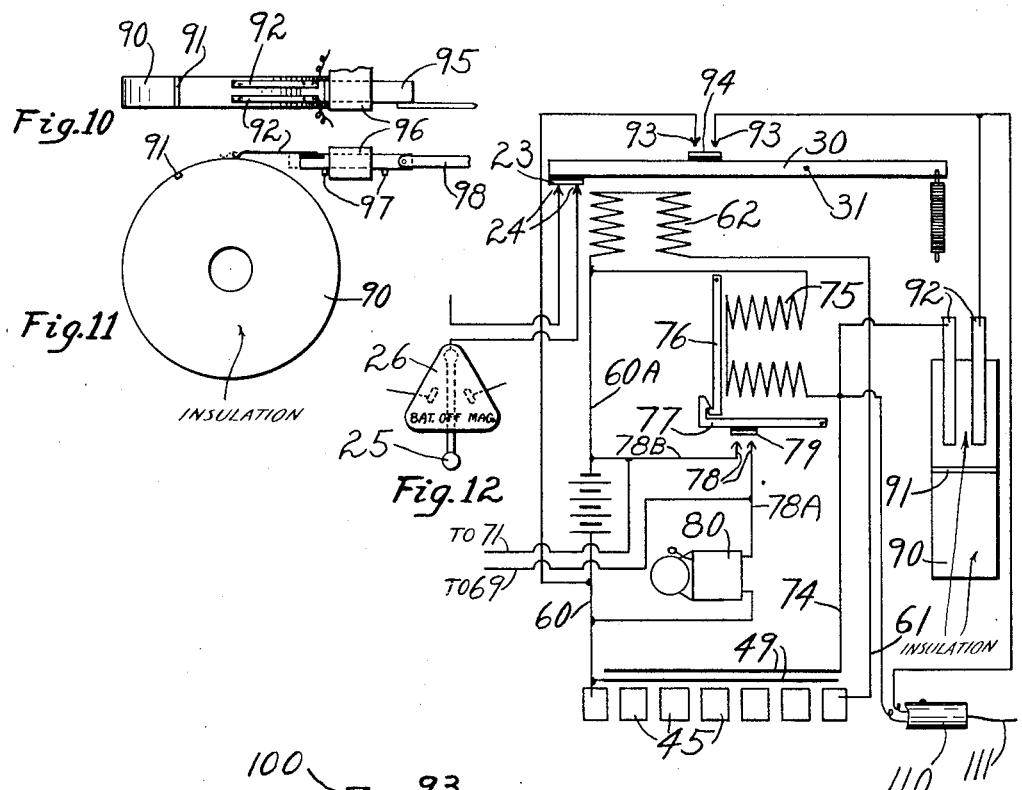
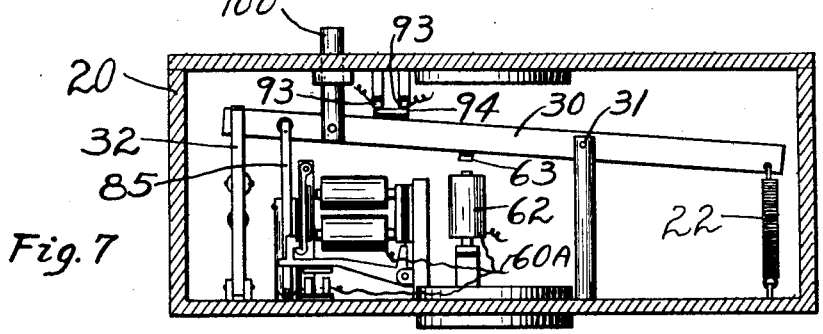
Witnesses
C. H. Kruger
F. H. Fassett
Inventor
Francis K. Fassett

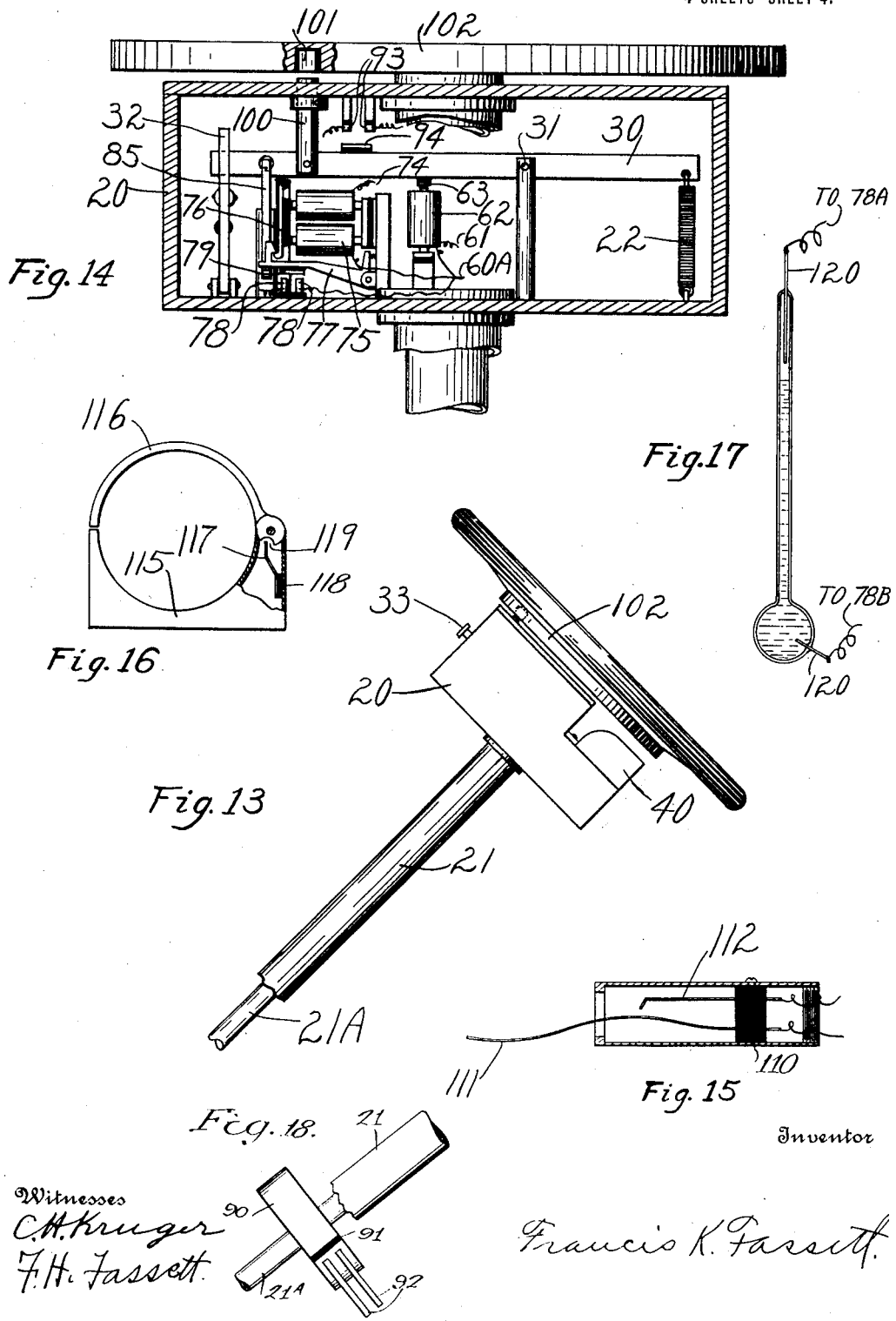

UNITED STATES PATENT OFFICE.

FRANCIS K. FASSETT, OF DAYTON, OHIO, ASSIGNOR TO LEO EHRLICH, OF ST. LOUIS, MISSOURI.

THEFT-PREVENTION DEVICE FOR AUTOMOBILES.

1,139,757.   Specification of Letters Patent.   Patented May 18, 1915.

Application filed February 6, 1914. Serial No. 816,901.

*To all whom it may concern:*

Be it known that I, FRANCIS K. FASSETT, a citizen of the United States, residing at Dayton, in the county of Montgomery and State of Ohio, have invented a new and useful Improvement in Theft-Prevention Devices for Automobiles, of which the following is a specification.

My invention relates to means for preventing the theft of automobiles and other vehicles, and it provides two forms of protection. First. It enables the driver to disable the vehicle and render it incapable of normal operation. Second. It provides for starting a continuous alarm should an attempt be made to move the vehicle or remove its disability.

In the preferred embodiment of the invention, the car is disabled by breaking the main line of the ignition circuit. As an additional safeguard,—to prevent the car being towed away,—an alarm will be thrown into operation by rotation of the rear axle. Or if preferred provision may be made whereby the alarm will be started if the steering wheel is rotated. Furthermore, it provides for starting the alarm in case certain parts of the equipment are removed; a tire, for example, or in case of fire.

Briefly the operation is as follows: Before leaving the car the driver presses a button which breaks the ignition circuit. It also makes an electrical contact, after which were the rear axle rotated the alarm would be automatically started. The disability of the car is removed by pressing a certain combination of buttons. These buttons are covered by a hood that prevents anyone seeing which ones are pressed, and provision is made for starting the alarm in case a button not belonging to the combination is pressed. After the alarm has been set going, either by pressing the wrong button or by moving the car, it can only be stopped by pressing the correct combination of buttons. The improbability of a thief striking the correct combination the first time is a mere matter of arithmetic based upon the fact that there are six buttons in the group, three of which belong to the combination. And since a single mistake will start the alarm, the almost absolute safety of the device is manifest. The combination may be changed from time to time, but a number of screws must be removed before this can be done. Each of these screws is arranged so that if it is withdrawn the alarm is started and cannot be stopped until after all of the screws are back in place.

One very great advantage of the button arrangement is that it can be manipulated as well in the dark as in the light, and another is that the driver does not have to keep track of a key.

Figure 2:
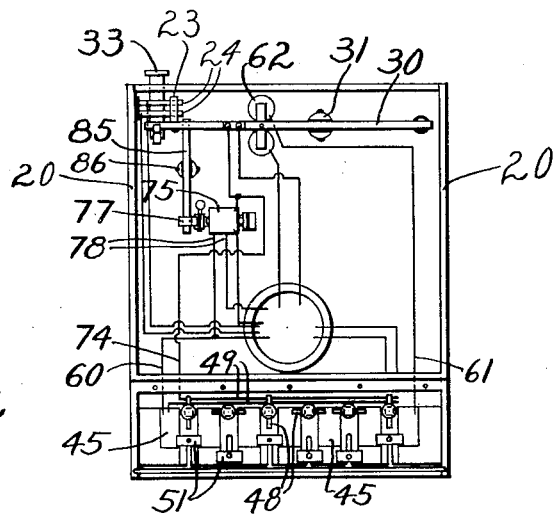

In the accompanying drawings, Figure 1 is an elevation of the steering wheel and pillar showing my apparatus in place below the wheel. Fig. 2 is a diagrammatic plan of the apparatus. Fig. 3 is an elevation of the apparatus as seen in Fig. 1, but with the side of the housing removed. Fig. 4 is a sectional view on line 4—4, Fig. 3. Fig. 5 is a view taken from the seat of the driver, with the apron 42 removed. Fig. 6 is a plan of the parts below the cover 41. Fig. 7 is a view similar to Fig. 4, but with the parts in the position they occupy when the car is disabled. Fig. 8 is one of the push buttons. Fig. 9 is the wedge block. Figs. 10 and 11 show one arrangement for starting the alarm in case the car is towed. Fig. 12 is a diagram of the electrical circuits. Fig. 13 is a view similar to Fig. 1, but showing a modified form of disabling device, namely, means for locking the steering wheel. Fig. 14 is a view similar to Fig. 4, but with the mechanism arranged to lock the steering wheel instead of break an electric circuit, and Figs. 15 and 16 show devices for starting the alarm if the extra tire is removed, Fig. 17 is a device to start the alarm in case of fire and Fig. 18 is a modification showing means for closing the alarm circuit if the steering wheel is moved.

Similar numerals indicate similar parts in all of the views.

Referring to Fig. 1, 20 is the housing which incloses the principal parts of the mechanism; this is rigidly secured to the steering pillar 21.

Referring now more particularly to Figs. 3 and 4, a lever 30 is fulcrumed at 31 and kept in normal position, in opposition to the spring 22, by a pawl 32. When the driver desires to disable the car he presses the button 33, which is attached to pawl 32, thereby releasing the lever 30. The lever rocks on its fulcrum 31 and raises a contact plate 23, carried by but insulated from the lever, off of contact springs 24. The wire of the ignition system which ordinarily connects to the lever 25 of the dash board switch 26 (see Fig. 12) is connected to one of the contacts 24, and a wire runs from the other contact spring 24 to said lever 25. When the button 33 is pressed the ignition is disabled just as when the lever 25 is thrown to the central or "off" position.

The controller is located at the rear of the housing 20, and is inclosed in a casing, a portion of which, comprising the hood 40, cover 41, and apron 42, is removable as a whole. This is held in place by screws 70, of which more will be said later. A row of contact plates 45 is mounted on a block 46 composed of insulating material, the upper surfaces of the plates being flush with the upper surface of the block. A square hole 47 is placed between each two plates and a push button is inserted in each hole, the buttons having square shanks. Each button carries a contact bar 48. Any button may be inserted with the bar extending across the plates 45, in which case the bar will connect the adjacent plates when the button is pressed down. If a button is inserted the other way the bar 48 will form a connection between two metallic strips 49 when the button is pressed. The buttons are kept in an elevated position by springs 50 (Fig. 3). Between each two contact plates a slot 51 is cut in the block 46 and a bridging device is inserted. These comprise a resilient plate 52, a shank 53, and foot 54, and because of the resiliency of the plate 52 they will remain where placed. In setting a combination, wherever a button is set so its bar 48 will not connect the adjacent contacts these contacts are bridged by sliding the bridging device to the inner end of the slot 51. This is clearly shown in Fig. 2, where the first, third and sixth breaks are bridged, while the second, fourth, and fifth breaks are left to be closed by pressing the corresponding buttons. Pressing these three buttons will therefore complete a continuous metallic connection from the first to the last plate 45, from each of which a wire (60 and 61 respectively) is carried to an electro-magnet 62. The wire 60 passes through a battery, or other source of current, and thereafter is indicated by 60^A. The magnet 62 is mounted in the bottom of the housing 20 and its armature 63 is carried by lever 30. When the driver desires to start the car he presses the proper buttons; i. e., the ones which are required to complete the circuit through wires 60 and 61. The magnet 62 becoming energized, the armature 63 is attracted, the lever 30 drawn down and the ignition circuit established to the switch lever 25. The pawl 32 locks the lever in the position shown in Figs. 3 and 4. To change the combination the hood (which includes the cover 41 and apron 42) is removed; then it is but the work of a moment to lift out one or more buttons, turn them one-fourth of a revolution and put them back. The bridging devices are then arranged accordingly. To prevent all of the buttons being depressed simultaneously a wedge block 64 is placed below the block 46, a short pin 65 extending down into a slot 66 in the bottom of the casing. The other end of the wedge block is somewhat wider than the distance between two button shanks and its sides are beveled at 67. When one of the adjacent buttons is pushed down it pushes the wedge block over into the path of the other adjacent shank and prevents that button being pressed down. Obviously, if both buttons are pressed simultaneously neither can go down far enough to touch the contact plates. The wedge block can be slipped in between any two buttons, and it therefore does not limit the number of possible combinations. A pin 68, smaller in diameter than the slot 66, keeps the block in position without interfering with its movements.

A spring 69 is mounted in the housing 20 at a point just below each screw 70, and a contact strip 71 is placed where the ends of the springs may contact with it. The normal tendency of the springs is to contact with the strip 71, but they are held away from such contact by the screws (see Fig. 3). These springs are connected by a common wire to the wire 78^A, while the strip 71 is connected by a wire to wire 78^B. It is obvious that if one or more of the screws is removed the bell 80 will be started to ringing, and it will continue to ring until all of the screws are in place again. Access to the housing 20 is attainable by removing the top and one side (20^A and 20^B). These are united as one member and are held in place by screws 73 which pass through the wall of the housing and are only accessible after the hood has been removed.

One strip 49 is connected to wire 60. The other strip 49 is connected by a wire 74 to an electro-magnet 75, and the other end of the magnet coil is connected to the wire 60^A. The armature of magnet 75 is carried by an arm 76, having a hook at its free end which normally sustains an arm 77. Below the arm 77 are two contact points 78 adapted to be connected by a plate 79 carried by but insulated from the arm 77. One of these contacts is connected by wire 78^B to wire 60^A. The other is connected by a wire 78^A to an alarm device, preferably an electric bell 80, and from thence to the wire 60, thereby supplying the necessary current for the alarm. If a button is pressed whose bar 48 bridges the strips 49 the magnet 75 will be energized, its armature attracted, and the arm 77 released and dropped on the contacts 78, the alarm being thereby started. A lever 85, pivoted at 86, is connected at one end to lever 30. The other end of this lever extends under the arm 77, and when the lever is drawn down by the magnet 62 the arm 77 is lifted from the contacts 78 and engaged by the hook at the end of arm 76.

The operation of the portion so far described will now be readily understood: The car having been disabled by pressing the button 33 it cannot be started or run on its own power. In order to remove the disability the proper combination of buttons must be pressed. If a single button is pressed which is not part of the combination the alarm is started and cannot be stopped without pressing the correct combination. So in addition to the fact that the car cannot be operated because of its disability, is the fact that a warning is given if anyone unacquainted with the combination tampers with the buttons. The buttons being inclosed under a hood prevents outsiders seeing which buttons the driver presses, and in this way the secrecy of the combination is maintained. As the buttons composing the combination may, because of their frequent use, come to shine or in some other way look different from the others, they may be changed around from time to time, thereby preserving uniformity of appearance.

To prevent the car being towed away, provision is made for sounding the alarm if it is moved. For this purpose a disk 90, composed of insulating material, is mounted on the rear axle. One or more blocks of metal 91 are inserted in the periphery of the disk. A pair of contact springs 92 are mounted on a block (not shown), one of which is connected to wire 74. The other contact 92 is connected to one of a pair of contacts 93, and from the other contact 93 a wire leads to wire 60. A plate 94 is carried by but insulated from lever 30 and is so located that when the lever is released to disable the car the plate connects the contacts 93. When, by rotation of the rear axle, the contact 91 connects the springs 92 the magnet 75 becomes energized and drops the arm 77 on contacts 78 as already described, thus starting the alarm. Instead of one contact 91 there may be more, if desired, in the periphery of the disk. One is sufficient, however, and is most desirable because of the small probability of the car stopping with the springs resting on the contact. Should this occur, however, the alarm will start the moment the driver presses the button 33, in which case he will immediately stop the alarm by pressing the correct combination of buttons. Then, to enable him to disable the car and not start the alarm he will have to drive it ahead, or back, slightly,—enough to move the contact from under the springs 92,—after which he can disable it without starting the alarm.

Figs. 10 and 11 show the springs 92 mounted on a bar 95 which is mounted to slide in a fixed support 96, its movements being limited by pins 97. By means of a connecting rod 98 terminating within his reach, the driver may shift the bar 95 to either of its extreme positions, in one of which positions it should be maintained. If he finds the alarm starts when he disables the car he presses the combination, thus stopping the alarm. He then shifts the bar 95 to the other position. He can then disable the car without the alarm being thrown on. With but one contact 91 in the disk it is evident that the car will seldom stop with the springs resting on it.

There are other ways of disabling an automobile than by disabling its ignition system. If it is an electric automobile it may be arranged so that a vital wire in the motor system will be disconnected, or interrupted, when the plate 23 lifts from the contact springs 24. As the specific manner of doing this would be well understood by anyone skilled in the art to which it pertains, no further explanation is necessary. Furthermore, instead of mounting the disk 90 on the rear axle it may be mounted on the steering wheel shaft 21$^A$, this being the shaft by which rotation of the steering wheel is communicated to the steering gear. If mounted on the steering wheel shaft the disk may be composed of conducting material and the block 91 of insulating material, the latter being located at a point where the springs 92 will rest upon it when the wheel is in its central position. If so arranged rotation of the wheel to either side of the central position would start the alarm. Obviously, it would be impracticable, if not quite impossible, to tow the car away without turning the steering wheel; so it is clear that the device would be just as effective as though placed on the rear axle. As the position of the block 91 with reference to the springs 92 would be under the control of the driver, it would not be necessary to have the latter mounted on the movable bar 95. Instead they could be carried by a suitable stationary mounting.

Figs. 13 and 14 illustrate a mechanism adapted to disable the car by locking the steering wheel. In this modification the lever 30 carries a plunger 100, which, when the button 33 is pressed enters a hole 101 in the under side of a disk 102 secured to the steering wheel. In Fig. 14 the plate 23 and springs 24 have been omitted, but it is obvious that they could be retained and the disability include the ignition (or motor) circuit as well as locking of the steering wheel. In other respects the construction and operation of the modification shown in Fig. 14 is the same as that already described.

As extra tires are frequently stolen from unguarded automobiles, I have provided a device (Fig. 15) for starting the alarm if the tire is removed from its mountings. This device comprises a tubular casing having a pair of contact springs mounted in a base 110, of insulating material, the spring 111 extending outside of the casing. This spring will normally lift up and contact with spring 112, but as long as the tire (not shown) rests on the lower spring they are kept apart as shown in the view. The springs are connected by wires to the wires which run to springs 92. In Fig. 16 the tire cannot be removed from the holder 115 without lifting the lid 116. In a recess formed in the holder a pair of contact springs 117 (one being behind the other in the drawing) are mounted on an insulating block 118, the free ends of which normally extend into a recess 119 in the hinge portion of the lid 116. The springs are connected by wires to the wires which connect to springs 92. When the lid is lifted the springs are engaged by said hinge portion and the alarm started. Other parts of the vehicle may be similarly guarded, the tool box for example. As the manner of doing this would be understood by anyone sufficiently skilled in the art and having the benefit of the foregoing description, it will not be necessary to disclose the various possibilities in detail.

In Fig. 17 a column of mercury in a tube is arranged to connect two wires, 120, in case of an abnormal rise in temperature in its vicinity. The wires 120 connect to wires 78^A and 78^B respectively. This device is adapted to start the alarm in case the automobile takes fire, whether it is in the garage or on the street. Moreover, it acts as a fire alarm in case the garage or other building in which the automobile may be takes fire.

While this is referred to as a theft prevention device it is to be understood that the term "theft" has a broad meaning. It is not only designed to prevent actual theft of the car when left alone, but it is useful in preventing the unauthorized use of the car by persons who have no idea of stealing it.

Having described a preferred embodiment of my invention, what I claim is as follows:—

1. A theft prevention device for self-propelled vehicles, comprising means for disabling the vehicle, a plurality of manually operated elements, means for removing said disability by operating a predetermined one or ones of said elements, and means for making an alarm if one of said elements other than said predetermined one or ones are operated.

2. A theft prevention device for self-propelled vehicles, comprising means for disabling the vehicle, a plurality of independent manually operated elements, means for removing said disability by operating a predetermined one or ones of said elements, means for making an alarm if one of said elements other than said predetermined one or ones are operated, and means for stopping the alarm by operating the said predetermined element or elements.

3. A theft prevention device for self-propelled wheeled vehicles, comprising means for disabling the vehicle, a plurality of independent manually operated elements, means for removing said disability by operating a predetermined one or ones of said elements, and means for making an alarm if the vehicle is moved while it is disabled.

4. A theft prevention device for self-propelled wheeled vehicles, comprising means for disabling the vehicle, a plurality of independent manually operated elements, means for removing said disability by operating a predetermined one or ones of said elements, means for making an alarm if the vehicle is moved while it is disabled, and means for stopping the alarm by operating the said predetermined element or elements.

5. In a theft prevention device for automobiles, the combination of means for disabling the automobile, an electrically controlled restoring mechanism for restoring the disability; a circuit including the restoring mechanism, a source of current and a controller whereby the circuit is broken in a series of places; a plurality of push buttons each of which is adapted to close one of said breaks, means for preventing the depression of all of the buttons simultaneously, means independent of the buttons for closing continuously any one or more of the breaks, and means for making an alarm if a button belonging to one of closed break is pressed.

6. A theft prevention device, comprising means for disabling an automobile by breaking a vital electrical circuit, an electro-magnet, means operated by said electro-magnet when it is energized for removing said disability, a source of electric current, means for sending the current through the magnet; said means comprising an electrical circuit which is normally open and a plurality of push buttons, predetermined ones of which must be pressed simultaneously to close the circuit; an alarm device, and means for starting said device if a button other than one of said predetermined ones is operated.

7. A theft prevention device, comprising means for disabling an automobile by breaking a vital electrical circuit, an electro-magnet, means operated by said electro-magnet when it is energized for removing said disability, a source of current, means for sending the current through the magnet; an alarm device, means for starting said alarm if a button other than one of said predetermined ones is operated, and means for stopping the alarm by pressing said predetermined buttons.

8. A theft prevention device, comprising means for disabling an automobile by breaking a vital electrical circuit, an electro-magnet, means operated by said electro-magnet when it is energized for removing said disability, a source of current, means for sending the current through the magnet; an electrical alarm device including an electrical circuit which is normally open at two points, means whereby one of said openings is closed when the automobile is disabled, and means whereby the other opening is closed if the automobile is moved, the closure of both openings contemporaneously starting said alarm.

9. A theft prevention device, comprising means for disabling an automobile by breaking a vital circuit, an electro-magnet, means operated by said electro-magnet when it is energized for removing said disability, a source of electric current, means for sending the current through the magnet: an electrical alarm device including an electrical circuit which is normally open at two points, means whereby one of said openings is closed when the automobile is disabled, means whereby the other opening is closed if the automobile is moved, the closure of both openings contemporaneously starting said alarm, and means whereby said alarm is stopped when said predetermined buttons are pressed.

10. In a device to disable automobiles to prevent them from being stolen, wherein closure of an electric circuit is required to remove the disability, the combination of a circuit closing device comprising: a succession of contact plates, each insulated from the other but all of which must be electrically connected to close the said circuit, a plurality of push buttons, means whereby each button may be arranged so it will or so it will not connect two of said plates when it is pressed, and means independent of the buttons for maintaining a connection between pairs of plates which, because of the arrangement of the buttons, cannot be connected by pressing the button; a device which when started makes a continuous alarm, and means for starting the alarm when a button other than one of said predetermined ones is pressed.

11. In a device to disable an automobile to prevent it from being stolen, wherein closure of an electric circuit is required to remove the disability, the combination of a circuit closing device comprising: a succession of contact plates, each insulated from each other but all of which must be electrically connected to close said circuit, a plurality of push buttons, means whereby each button may be arranged so it will or so it will not connect two of said plates when it is pressed, and means independent of the buttons for maintaining a connection between pairs of plates which, because of the arrangement of the buttons, cannot be connected by pressing a button; a device which when started makes a continuous alarm, means for starting the alarm when a button other than one of said predetermined ones is pressed, and means whereby the alarm may be stopped if said predetermined buttons, and those alone, are pressed.

12. In a device to disable an automobile to prevent it from being stolen, wherein closure of an electro circuit is required to remove the disability, the combination of a circuit closing device comprising a succession of contact plates, each insulated from the other but all of which must be electrically connected to close the said circuit, a plurality of push buttons, means whereby each button may be arranged so it will or so it will not connect two of said plates when it is pressed, and means independent of the buttons for maintaining a connection between pairs of plates which, because of the arrangement of the buttons, cannot be connected by pressing a button; a device which when started makes a continuous alarm, means for starting the alarm when a button other than one of the predetermined ones is pressed, and means for preventing contemporaneous depression of all of the buttons.

13. In a device for disabling an automobile to prevent it from being stolen, wherein closure of an electric circuit is required to remove the disability, the combination of a circuit closing device comprising a row of push buttons, each of certain ones of which is adapted to close a separate break in the circuit, contemporaneous depression of all of said certain buttons being required to complete the circuit, means to prevent contemporaneous depression of all the buttons, an alarm device, and means for starting the alarm if a button other than one of said certain ones is depressed.

14. In a device for disabling an automobile to prevent it from being stolen, wherein closure of an electric circuit is required to remove the disability, the combination of a circuit closing device comprising a row of push buttons, each of certain ones of which is adapted to close a separate break in the circuit, contemporaneous depression of all of said certain buttons being required to complete the circuit, the button mechanism being inclosed in box through which the buttons extend, the cover of the box being held on by screws; an alarm device, and means for starting the alarm if one or more of the screws is removed.

15. In a device for disabling an automobile to prevent it from being stolen, wherein closure of an electric circuit is required to remove the disability, the combination of a circuit closing device comprising a row of push buttons, each of certain ones of which is adapted to close a separate break in the circuit, contemporaneous depression of all of said certain buttons being required to complete the circuit, means to prevent contemporaneous depression of all of the buttons, the button mechanism being inclosed in a box through which the buttons extend, the cover of the box being held on by screws, an alarm device, means for starting the alarm if a button other than said certain ones is pressed, and means for starting the alarm if one or more of the screws is removed.

16. In a device to disable an automobile to prevent it from being stolen, wherein closure of an electric circuit is required to remove the disability, the combination of a circuit closing device comprising: a succession of contact plates, each insulated from the other but all of which must be electrically connected to close the said circuit, a plurality of push buttons, means whereby each button may be arranged so it will or so it will not connect two of said plates when it is pressed, and means independent of the buttons for maintaining a connection between pairs of plates which, because of the arrangement of the buttons, cannot be connected by pressing a button; a device which when started makes a continuous alarm, means for starting the alarm when a button other than one of the predetermined ones is pressed, a box in which the foregoing mechanism is inclosed with the buttons passing through one of its walls, the lid of the box being held on by screws, and means for starting the alarm if one or more screws is withdrawn.

17. A theft prevention device for self-propelled vehicles, comprising means for disabling the vehicle, a plurality of push buttons, means for removing the disability by pressing one or more of said buttons, the number of buttons and the particular one or ones which must be pressed to remove the disability being predetermined, and means for making an alarm if another than one of said predetermined buttons is pressed.

18. A theft prevention device for self-propelled vehicles, comprising a push button and means associated therewith for disabling the vehicle, a plurality of other push buttons, means for removing the disability by pressing one or more of said buttons, the number of buttons and the particular one or ones which must be pressed to remove the disability being predetermined, and means for making an alarm if another than one of said predetermined buttons is pressed.

19. A theft prevention device for self-propelled vehicles, comprising manually operated means for disabling the vehicle, a plurality of push buttons, means for removing the disability by pressing one or more of said buttons, the number of buttons and the particular one or ones which must be pressed to remove the disability being predetermined, and means for making an alarm if another one than of said predetermined buttons is pressed.

FRANCIS K. FASSETT.

Witnesses:
C. H. KRUGER,
F. H. FASSETT.